US006976791B2

(12) United States Patent
Kanehisa et al.

(10) Patent No.: US 6,976,791 B2
(45) Date of Patent: Dec. 20, 2005

(54) BEARING APPARATUS FOR A BICYCLE HUB

(75) Inventors: Takanori Kanehisa, Sakai (JP); Takuji Tatsumi, Sakai (JP)

(73) Assignee: Shimano, Inc., Sakai (JP)

( * ) Notice: Subject to any disclaimer, the term of this patent is extended or adjusted under 35 U.S.C. 154(b) by 118 days.

(21) Appl. No.: 10/604,815

(22) Filed: Aug. 19, 2003

(65) Prior Publication Data

US 2004/0165805 A1  Aug. 26, 2004

(30) Foreign Application Priority Data

Aug. 22, 2002 (JP) .............................. 2002-241442

(51) Int. Cl.[7] .............................................. B60B 27/00
(52) U.S. Cl. .................... 384/545; 384/537; 384/906
(58) Field of Search ................. 384/545, 537, 384/540, 906, 449; 301/110.5; 280/279

(56) References Cited

U.S. PATENT DOCUMENTS

| 700,251 | A | * | 5/1902 | Smith ......................... 384/540 |
| 1,526,008 | A | * | 2/1925 | Olson .......................... 384/540 |
| 5,284,383 | A | * | 2/1994 | Lehanneur ................ 301/110.5 |
| 5,964,332 | A | | 10/1999 | King |
| 5,997,104 | A | * | 12/1999 | Campagnolo ............... 384/545 |
| 6,260,931 | B1 | * | 7/2001 | Stewart .................... 301/110.5 |
| 2004/0135425 | A1 | | 7/2004 | Irie |

FOREIGN PATENT DOCUMENTS

FR  2832672 A1  5/2003

* cited by examiner

Primary Examiner—Thomas R. Hannon
(74) Attorney, Agent, or Firm—James A. Deland

(57) ABSTRACT

A bearing apparatus for a bicycle hub comprises a bearing member and a lock member. The bearing member comprises an inner peripheral surface for receiving a hub spindle therein, a bearing surface for engaging a bearing, and an interlock portion. The first lock member comprises an inner peripheral surface for receiving the hub spindle therein and a mating portion for engaging the interlock portion of the bearing member so that the bearing member is nonrotatably fixed relative to the first lock member.

20 Claims, 5 Drawing Sheets

BEARING APPARATUS FOR A BICYCLE HUB

BACKGROUND OF INVENTION

The present invention is directed to bicycles and, more particularly, to a bearing apparatus for a bicycle hub.

Bicycle wheels typically include a hub located in the center of the wheel for rotatably mounting the wheel onto the bicycle. A conventional hub comprises a hub spindle nonrotatably mounted on the frame, a hub body installed on the outer periphery of the hub spindle, and a pair of bearings arranged between the hub spindle and hub body at opposite ends of the hub. A male threaded portion usually is formed at each end of the hub spindle, and the hub body usually includes a pair of hub flanges located at opposite ends of the hub body. A plurality of spokes are connected to the pair of hub flanges for connecting the wheel rim to the hub body. Each bearing may comprise a cup supported to the hub body, a cone having a female threaded portion for engaging the male threaded portion of the hub spindle, and a plurality of balls installed between the cup and cone. The plurality of balls are installed in a holder that supports the balls spaced apart in the circumferential direction. The cone is locked by means of a lock nut that is screwed onto the hub spindle adjacent to the cone.

When assembling such a hub, the hub body first is installed on the hub spindle, and the cup (if formed separately from the hub body) is installed on the hub body. Next, the plurality of balls and their associated retainers are installed in the cups, and grease is applied. Once the balls have been installed, the cones are screwed onto the left and right sides of the hub spindle to rotatably set the hub body on the hub spindle. At this time, the axial position of the hub body is adjusted by adjusting the axial position of the cones. This step is called cone adjustment. Finally, the cones are locked with locknuts.

With the conventional arrangement described above, cone adjustment must be performed with the cones installed on both sides of the hub spindle, thus making the process of adjusting the cones rather inconvenient. Additionally, since locknuts are needed to lock the screwed-on cones, the locking operation is inconvenient as well.

SUMMARY OF INVENTION

The present invention is directed to various features of a bearing apparatus for a bicycle. In one embodiment, a bearing apparatus for a bicycle hub comprises a bearing member and a lock member. The bearing member comprises an inner peripheral surface for receiving a hub spindle therein, a bearing surface for engaging a bearing, and an interlock portion. The first lock member comprises an inner peripheral surface for receiving the hub spindle therein and a mating portion for engaging the interlock portion of the bearing member so that the bearing member is nonrotatably fixed relative to the first lock member. Additional inventive features will become apparent from the description below, and such features alone or in combination with the above features may form the basis of further inventions as recited in the claims and their equivalents.

DETAILED DESCRIPTION

Figure 1:
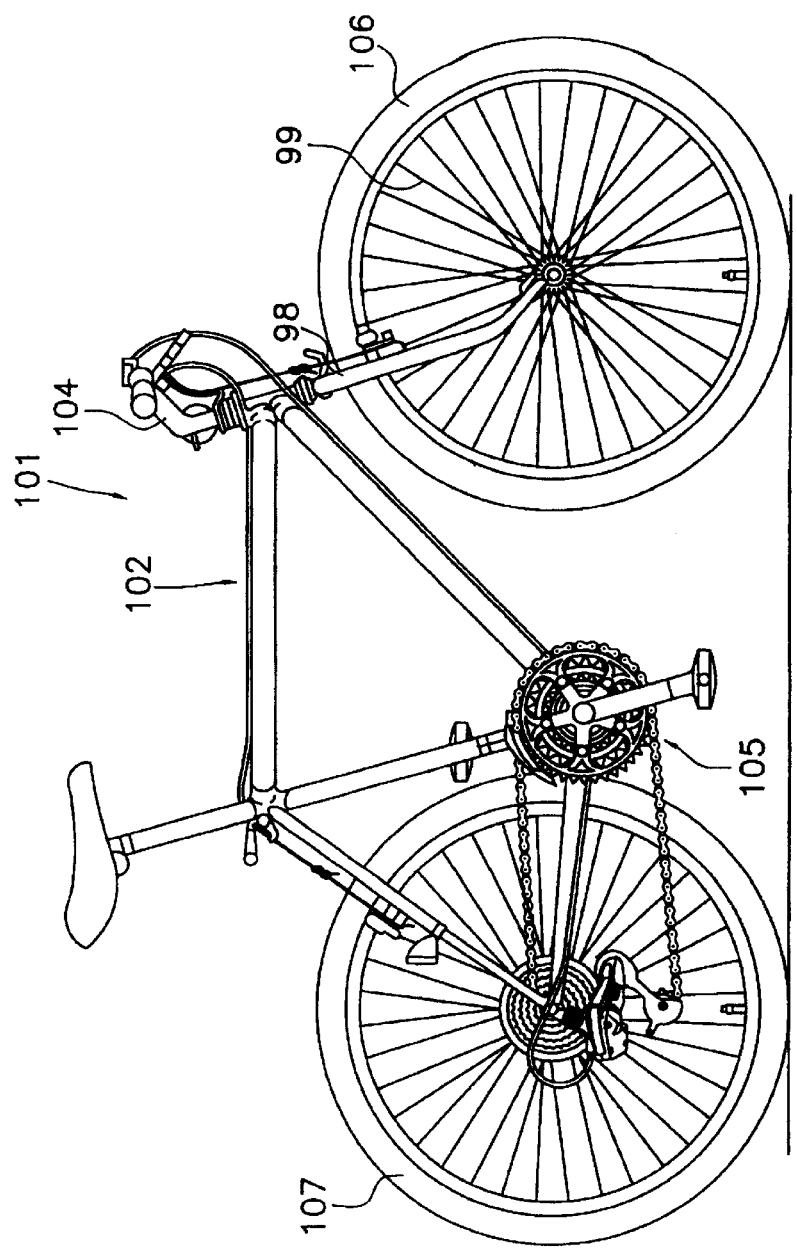
FIG. 1 is a side view of a bicycle that includes a wheel hub with a bearing apparatus.
Figure 2:
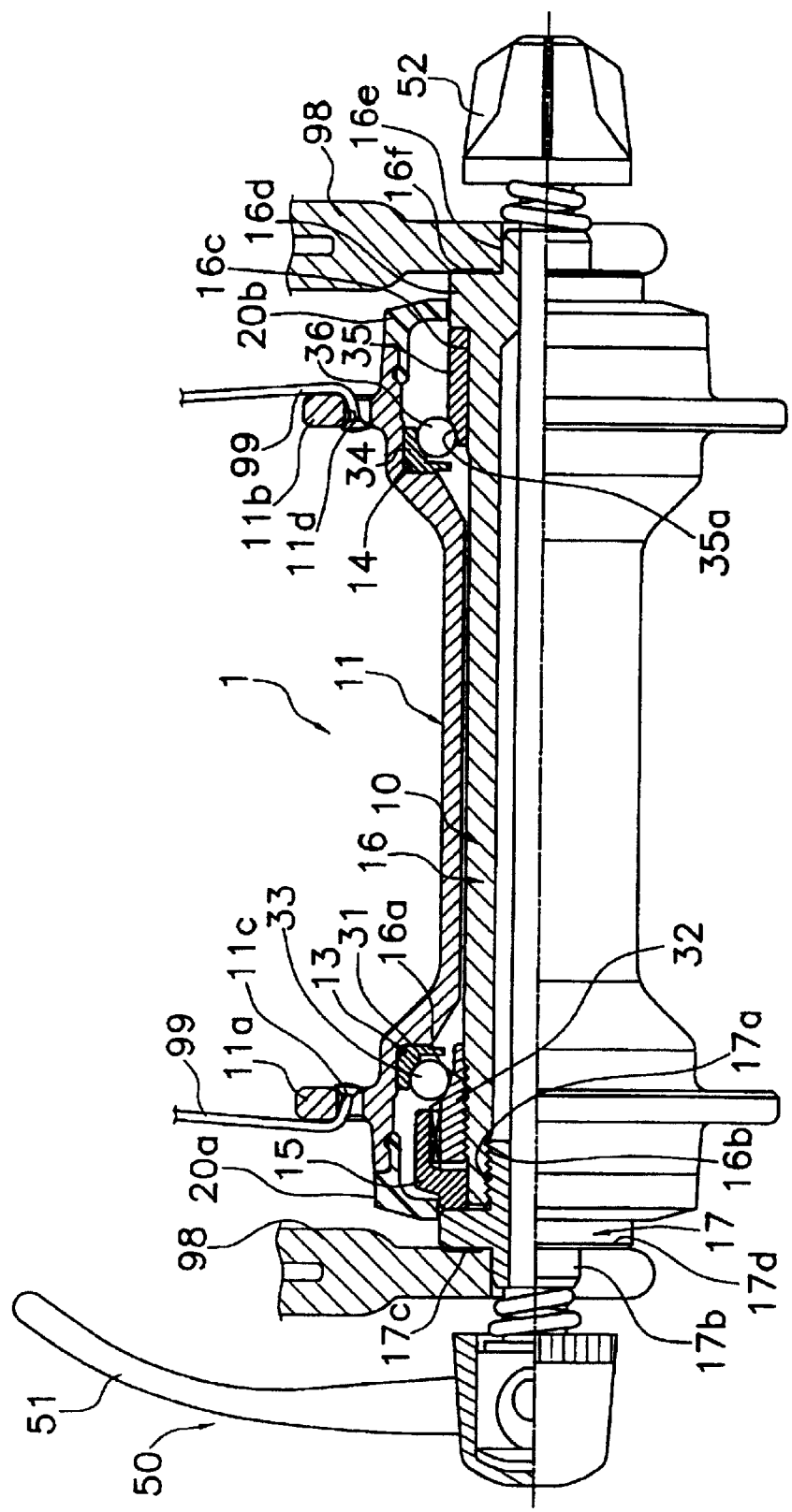
FIG. 2 is a partial cross-sectional view of the hub illustrating a particular embodiment of a bearing apparatus.

FIG. 1 is a side view of a bicycle 101 that includes at least one wheel hub with a bearing apparatus. Bicycle 101 comprises a frame 102 that includes a front fork 98; a handlebar 104 affixed to front fork 98; a drive portion 105 comprising a chain, pedals, derailleurs, etc.; and front and back wheels 106, 107 with spokes 99. As shown in FIG. 2, a front hub 1 (for example) comprises a hub spindle 10 for attachment to front fork 98, a hub shell 11 disposed on the outer periphery of hub spindle 10, and first and second bearings 13 and 14 disposed between hub spindle 10 and hub shell 11.

Hub spindle 10 may be fabricated, for example, from high strength A7075 aluminum alloy for light weight, and it comprises a hollow first spindle portion 16 and a hollow second spindle portion 17 screwed into the first spindle portion 16. The ends of hub spindle 10 are attached to the left and right distal ends of front fork 98 by means of a conventional quick release mechanism 50 that extends through the hollow portions of hub spindle 10 and includes a cam lever 51 and a nut 52.

First spindle portion 16 constitutes the majority of hub spindle 10, and first and second bearings 13 and 14 are mounted at first and second ends of first spindle portion 16. At the first end of first spindle portion 16 (the left end in FIG. 2), a male threaded portion 16a is provided for attaching a first cone 32 of first bearing 13, a female threaded portion 16b is provided for attaching second spindle portion 17, and a first interlock portion 16g (FIG. 4) comprising mutually parallel chamfered portions is provided for nonrotatably coupling a lock member 15. At the second end of first spindle portion 16 (the right end in FIG. 2), a press fit portion 16c is provided for securing a second cone 35 of second bearing 14 by a press fit, a projecting portion 16d is provided adjacent to and axially outwardly from press fit portion 16c for positioning purposes, and a small-diameter fork fastening portion 16e is provided adjacent to and axially outwardly from projecting portion 16d for fastening the right side of front fork 98. A knurled portion 16f formed by radially patterned indents is disposed on the right face of fork fastening portion 16e to enhance the coupling between first spindle portion 16 and fork 98.

Second spindle portion 17 is a cylindrical member having a small diameter male threaded spindle coupling portion 17a for engaging the female threaded portion 16b of first spindle portion 16, a large-diameter collar portion 17d adjacent to and axially outwardly from male threaded portion 17a for detaining lock member 15, and a small-diameter fork fastening portion 17b adjacent to and axially outwardly from collar portion 17d for fastening the left side of the front fork 98. A knurled portion 17c formed by radially patterned indents is disposed on the left face of fork fastening portion 17b to enhance the coupling between second spindle portion 17 and fork 98. A hexagonal tool mating portion 17e (FIG. 4) is provided at the inner peripheral surface of second spindle portion 17 at fork fastening portion 17b so a tool may rotate that second spindle portion 17.

Hub shell 11 may be fabricated from a relatively strong, lightweight aluminum alloy such as A6151, and it comprises an axially symmetrical cylindrical member with a constricted center portion. Disk-shaped first and second hub flanges 11a and 11b are formed on the outer peripheral surfaces of the large-diameter portions of the hub shell. First and second hub flanges 11a and 11b include a corresponding plurality of (e.g., sixteen) spoke holes 11c and 11d equally spaced in the circumferential direction. The pitch of spoke holes 11c and spoke holes 11d are offset by one-half pitch with respect to each other. Cover members 20a and 20b are detachably mounted to the opposite ends of hub shell for covering the gap with the hub spindle 10. Cover members 20a and 20b may be formed from a synthetic resin, for example.

Figure 3:
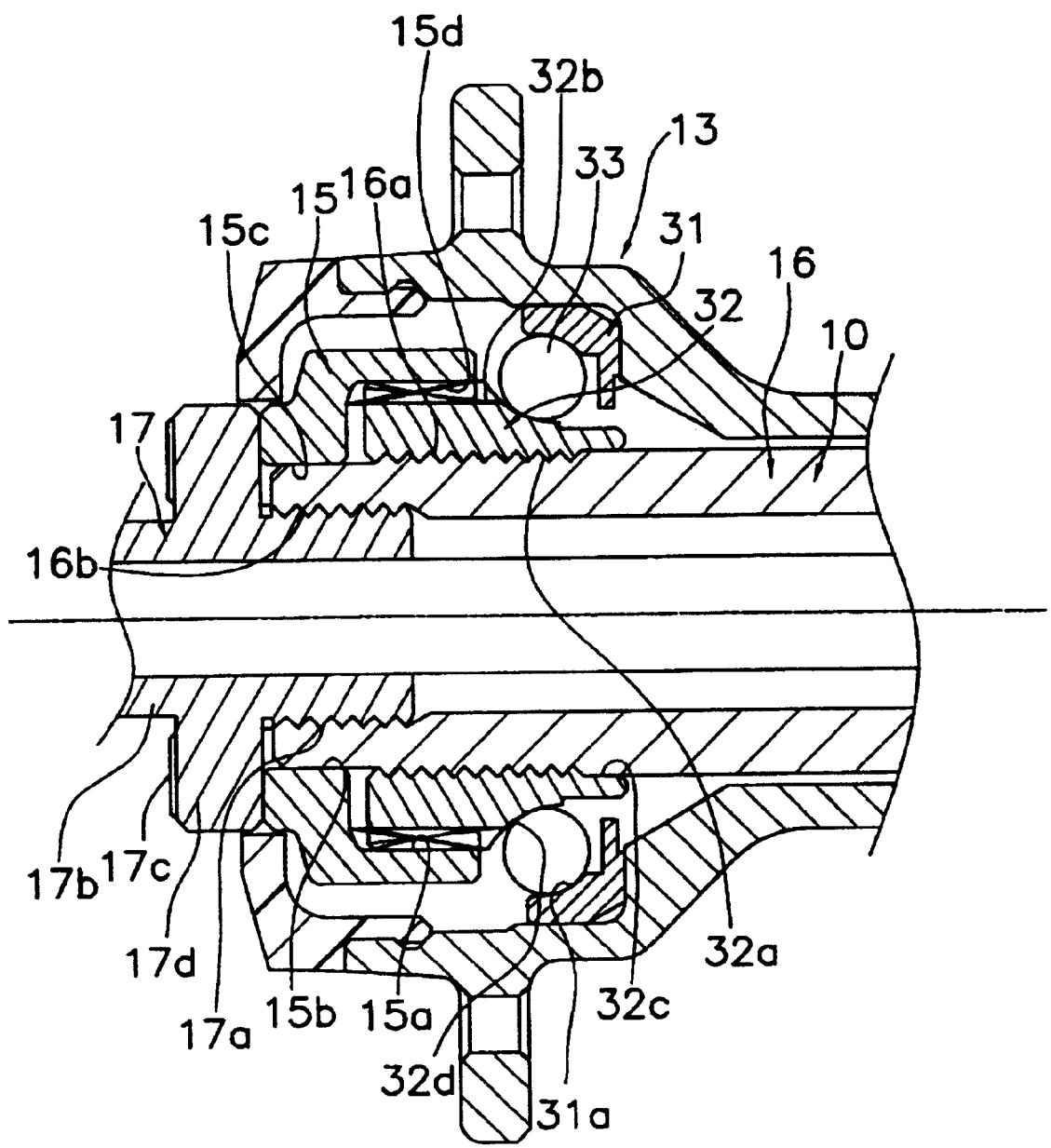
FIG. 3 is a more detailed view of the left side of the hub shown in FIG. 2.
Figure 4:
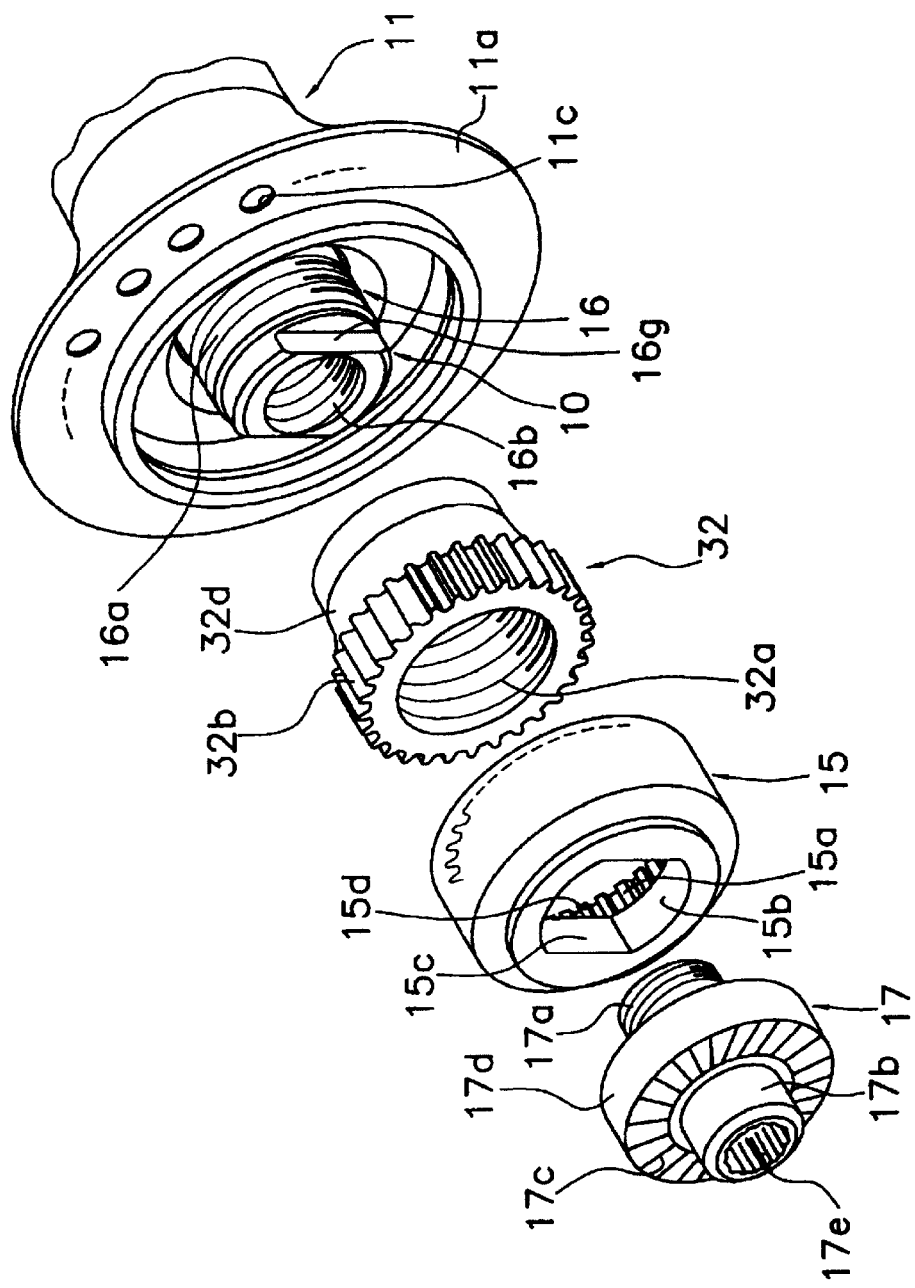
FIG. 4 is an exploded view of the components shown in FIG. 3.

As shown in FIGS. 3 and 4, first bearing 13 has a first cup 31 disposed on hub shell 11, a first cone 32 threadably mating with hub spindle 10, and a plurality of (e.g., eight) balls 33 disposed between first cup 31 and first cone 32 in rolling contact with both members. First cup 31 is a cylindrical member having a generally L-shaped cross-section, and it is securely press-fit into the inner peripheral surface of the left side large-diameter portion of hub shell 11. A curved rolling face 31a for contacting balls 33 is formed on the inner peripheral surface face of first cup 31. First cup 31 may be fabricated from bearing steel or some other iron base alloy, for example, to resist wear.

First cone 32 is a cylindrical member which also may be fabricated from bearing steel or some other iron base alloy, for example. First cone 32 comprises a female threaded portion 32a for threadably mating with the male threaded portion 16a formed on the first spindle portion 16 of hub spindle 10; an interlock portion 32b comprising a plurality of circumferentially disposed radially outwardly extending splines for mating with lock member 15; a press-fit securing portion 32c for press fitting onto a smooth portion of first spindle portion 16 axially inwardly from the male threaded portion 16a (for providing additional resistance to turning), and an outer peripheral curved rolling face 32d for contacting balls 33. Balls 33 are circumferentially spaced at equal intervals by means of a retainer, not shown. Grease is packed around balls 33.

As shown in FIG. 2, second bearing 14 has a second cup 34 disposed on hub shell 11, a second cone 35 affixed to hub spindle 10, and a plurality of (e.g., eight) balls 36 disposed between second cone 35 and second cup 34 in rolling contact with both members. Second cup 34 and second cone 35 may be fabricated from the same materials as first cup 31 and first cone 32, and second cup 34 may be shaped similar to first cup 31. Second cone 35 is securely press-fit onto press fit portion 16c of first spindle portion 16. An outer peripheral curved rolling surface 35a is formed on second cone 35 for contact by balls 33. Second cone 35 is positioned by means of projecting portion 16d of first spindle portion 16.

As shown in FIGS. 3 and 4, lock member 15 is a cylindrical member having a first inner peripheral surface 15a and a second inner peripheral surface 15b that is smaller in diameter than first inner peripheral surface 15a. A mating portion 15d is formed on first inner peripheral surface 15a, and a spindle mating portion 15c is formed on second inner peripheral surface 15b. Spindle mating portion 15c is designed to nonrotatably engage first interlock portion 16g of first spindle portion 16, and it comprises an oval slit having mutually parallel sides formed by second inner peripheral surface 15b. Mating portion 15d comprises a plurality of splines that engage the plurality of splines that form the second interlock portion 32b of first cone 32. Thus, lock member 15 nonrotatably locks with both hub spindle 10 and first cone 32 so that first cone 32 may be nonrotatably locked relative to hub spindle 10.

When assembling the front hub 1, the second cone 35 is first securely press fit onto the right end of first spindle portion 16, and first and second cups 31 and 34 are securely press fit into the respective ends of hub shell 11. The plurality of balls 36 then are installed in the second cone 35, and the hub shell 11 is installed on the outer periphery of the first spindle portion 16 from the left end. This operation may be readily performed, for example, by standing first spindle portion 16 upright with second cone 35 disposed at the bottom.

Once the hub shell 11 has been installed, the plurality of balls 33 are installed in first cup 31, first cone 32 is threaded onto the male threaded portion 16a of the first spindle portion 16, and a cone adjustment procedure is performed. Here, adjusting only first cone 32 rather than both first and second cones 32 and 35 carries out cone adjustment. Thus, the cone adjustment operation is easier. Once the cone adjustment procedure has been completed, the spindle mating portion 15c of the lock member 15 is aligned with the first interlock portion 16g of the first spindle portion 16, and the rotational position of the first cone 32 is adjusted so that the interlock portion 32b of first cone 32 is aligned with the mating portion 15d of lock member 15. Since the second interlock portion 32b and mating portion 15d both are formed of a plurality of splines, the two portions mesh together at a large number of rotational positions, thus enabling the lock member 15 to be installed on the first cone 32 without causing bearing looseness. Once lock member 15 is mounted to first spindle portion 16 and first cone 32, the lock member 15 is nonrotatably mounted with respect to first spindle portion 16 and first cone 32, and first cone 32 is nonrotatably locked with respect to hub spindle 10. Since simply aligning the rotational position and mounting the lock member 15 carry out locking of the first cone 32, the locking operation is relatively easy.

When these operations are completed, cover members 20a and 20b are installed on the ends of hub shell 11, and second spindle portion 17 (which functions as a second lock member) is installed on first spindle portion 16 to detain lock member 15. Using second spindle portion 17 to detain lock member 15 eliminates the need for a separate detaining member for lock member 15. Finally, the quick release mechanism 50 is passed through the hollow portions of hub spindle 10 and set. This completes the assembly of the front hub 1.

While the above is a description of various embodiments of inventive features, further modifications may be employed without departing from the spirit and scope of the present invention. For example, in the embodiment described above the interlock portion 16g of first hub spindle 16 and the spindle mating portion 15c of lock member 15 interlock at two rotational positions, whereas the interlock portion 32b of first cone 32 and the mating portion 15d of lock member 15 interlock at a large plurality of rotational positions. However, the opposite would be acceptable as well. That is, the hub spindle and lock member may interlock at a plurality of rotational positions, while the lock member and first cone may interlock at two rotational positions.

The embodiment described above applied an inventive bearing assembly to a front hub, but such a bearing assembly could be implemented in a rear hub. The hub configuration need not be limited to that shown in the above embodiment. For example, the hub shell may be a split type comprising a plurality of members, or some other configuration, and the hub also may house a brake adjusting mechanism and/or a generator mechanism.

Figure 5:
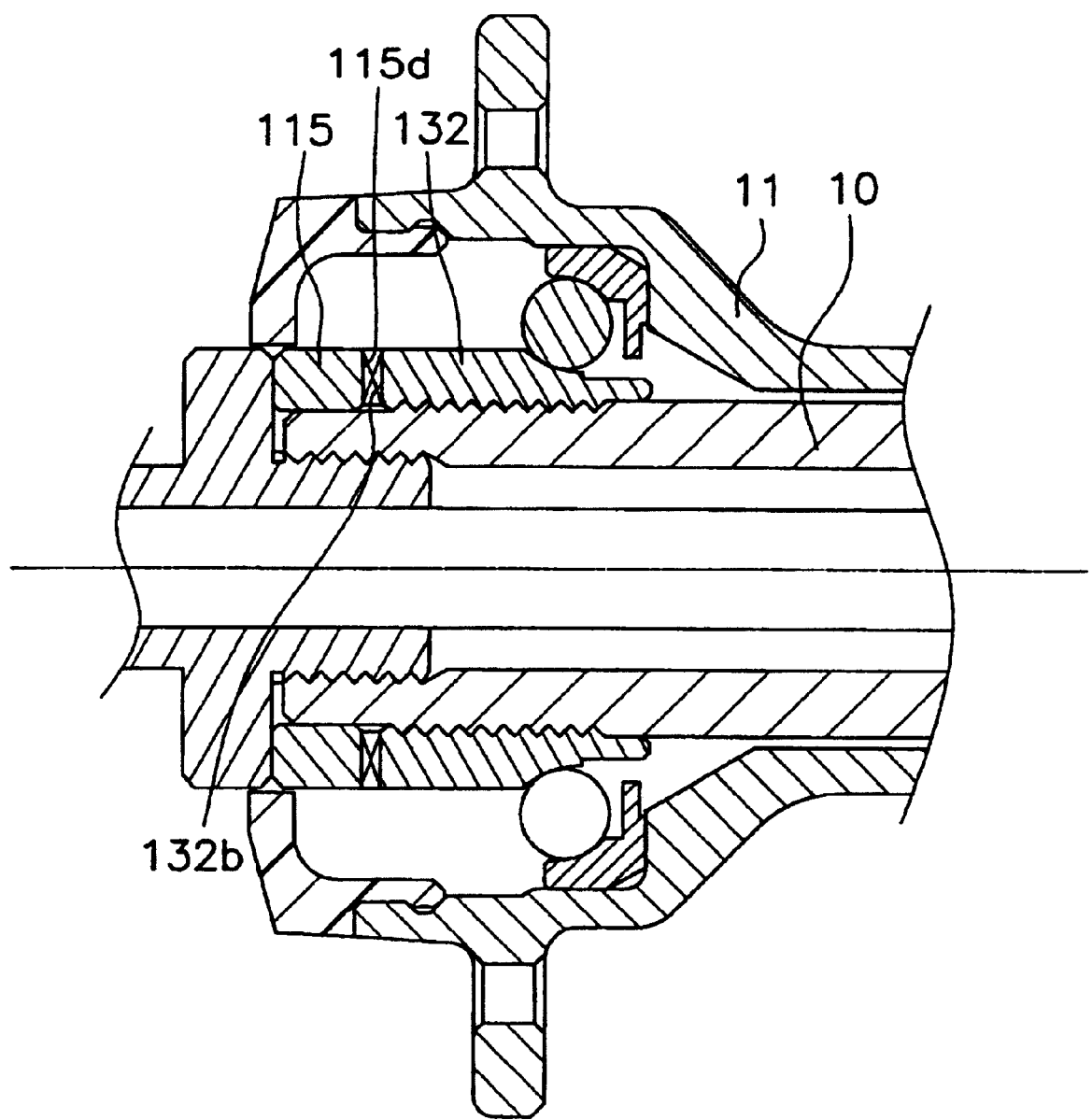
FIG. 5 is a detailed view of another embodiment of a bearing apparatus.

In the embodiment described above, lock member 15 and first cone 32 interlock at their inner and outer peripheral surfaces, respectively, but interlocking may be performed at their end faces. FIG. 5 is a detailed view of another embodiment of a bearing apparatus showing such an arrangement. In this embodiment, an interlock portion 132b comprising a plurality of axially extending splines is formed on a left end face of a first cone 132. A lock member 115 having a cylindrical shape has formed at a first end thereof a spindle mating portion (not shown) comprising an oval slit as in the first embodiment. A mating portion 115d comprising a plurality of axially extending splines is formed at the other end of lock member 115. The mating portion 115d of lock member 115 engages the interlock portion 132b of first cone 132 so that lock member 115 and first cone 132 operate in a manner similar to the preceding embodiment.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bearing apparatus for a bicycle hub comprising:
   a bearing member comprising:
     an inner peripheral surface for receiving a hub spindle therein;
     a bearing surface for engaging a bearing; and
     an interlock portion; and
   a first lock member comprising:
     an inner peripheral surface for receiving the hub spindle therein;
     a mating portion for engaging the interlock portion of the bearing member so that the bearing member is nonrotatably fixed relative to the first lock member; and
     a spindle mating portion axially spaced from the mating portion and shaped to nonrotatably fix the first lock member relative to the hub spindle;
     wherein the mating portion and the spindle mating portion are one piece.

2. The apparatus according to claim 1 wherein the interlock portion is disposed on an outer peripheral surface of the bearing member.

3. The apparatus according to claim 2 wherein the mating portion is disposed on an inner peripheral surface of the first lock member.

4. A bearing apparatus for a bicycle hub comprising:
   a bearing member comprising:
     an inner peripheral surface for receiving a hub spindle therein;
     a bearing surface for engaging a bearing; and
     an interlock portion; and
   a first lock member comprising:
     an inner peripheral surface for receiving the hub spindle therein; and
     a mating portion for engaging the interlock portion of the bearing member so that the bearing member is nonrotatably fixed relative to the first lock member;
   wherein the inner peripheral surface of the bearing member comprises a press fit portion structured to be press fit to the hub spindle.

5. A bearing apparatus for a bicycle hub comprising:
   a bearing member comprising:
     an inner peripheral surface for receiving a hub spindle therein;
     a bearing surface for engaging a bearing; and
     an interlock portion;
     wherein the interlock portion is disposed on an end face of the bearing member; and
   a first lock member comprising:
     an inner peripheral surface for receiving the hub spindle therein;
     a mating portion for engaging the interlock portion of the bearing member so that the bearing member is nonrotatably fixed relative to the first lock member; and
     a spindle mating portion axially spaced from the mating portion and shaped to nonrotatably fix the first lock member relative to the hub spindle.

6. The apparatus according to claim 5 wherein the mating portion is disposed on an end face of the first lock member.

7. A bearing apparatus for a bicycle hub comprising:
   a bearing member comprising:
     an inner peripheral surface for receiving a hub spindle therein;
     a bearing surface for engaging a bearing; and
     an interlock portion;
   a first lock member comprising:
     an inner peripheral surface for receiving the hub spindle therein;
     a mating portion for engaging the interlock portion of the bearing member so that the bearing member is nonrotatably fixed relative to the first lock member; and
     a spindle mating portion axially spaced from the mating portion and shaped to nonrotatably fix the first lock member relative to the hub spindle; and
   a second lock member, comprising:
     a spindle coupling portion for axially retaining the second lock member to the hub spindle; and
     a collar that engages the first lock member for axially retaining the first lock member to the hub spindle.

8. A bearing apparatus for a bicycle hub comprising:
   a bearing member comprising:
     an inner peripheral surface for receiving a hub spindle therein;
     a bearing surface for engaging a bearing; and
     an interlock portion;
   a first lock member comprising:
     an inner peripheral surface for receiving the hub spindle therein; and
     a mating portion for engaging the interlock portion of the bearing member so that the bearing member is nonrotatably fixed relative to the first lock member; and
   a second lock member comprising:
     a spindle coupling portion for axially retaining the second lock member to the hub spindle; and a collar that engages the first lock member for axially retaining the first lock member to the hub spindle;

wherein the spindle coupling portion comprises a threaded outer peripheral surface structured for mating with a threaded inner peripheral surface of the hub spindle.

9. A bearing apparatus for a bicycle hub comprising:

a bearing member comprising:
- an inner peripheral surface for receiving a hub spindle therein;
- a bearing surface for engaging a bearing; and
- an interlock portion;
- wherein the inner peripheral surface of the bearing member comprises a female threaded portion structured to mate with a male threaded portion of the hub spindle; and a first lock member comprising:
- an inner peripheral surface for receiving the hub spindle therein;
- a mating portion for engaging the interlock portion of the bearing member so that the bearing member is nonrotatably fixed relative to the first lock member; and
- a spindle mating portion axially spaced from the mating portion and shaped to nonrotatably fix the first lock member relative to the hub spindle.

10. The apparatus according to claim 9 wherein the interlock portion is disposed on an end face of the bearing member.

11. The apparatus according to claim 10 wherein the mating portion is disposed on an end face of the first lock member.

12. The apparatus according to claim 11 wherein the first lock member further comprises a spindle mating portion shaped to nonrotatably fix the first lock member relative to the hub spindle.

13. The apparatus according to claim 12 further comprising a second lock member, wherein the second lock member comprises:
- a spindle coupling portion for axially retaining the second lock member to the hub spindle; and
- a collar that engages the first lock member for axially retaining the first lock member to the hub spindle.

14. A bearing apparatus for a bicycle hub comprising:

a bearing member comprising:
- an inner peripheral surface having a female threaded portion structured to mate with a male threaded portion of a hub spindle;
- a bearing surface for engaging a bearing; and
- an interlock portion; and a first lock member comprising:
- an inner peripheral surface for receiving the hub spindle therein; and
- a mating portion for engaging the interlock portion of the bearing member so that the bearing member is nonrotatably fixed relative to the first lock member; and wherein the interlock portion is disposed on an outer peripheral surface of the bearing member.

15. The apparatus according to claim 14 wherein the mating portion is disposed on an inner peripheral surface of the first lock member.

16. The apparatus according to claim 15 wherein the first lock member further comprises a spindle mating portion shaped to nonrotatably fix the first lock member relative to the hub spindle.

17. The apparatus according to claim 16 further comprising a second lock member, wherein the second lock member comprises:

a spindle coupling portion for axially retaining the second lock member to the hub spindle; and a collar that engages the first lock member for axially retaining the first lock member to the hub spindle.

18. The apparatus according to claim 17 wherein the spindle coupling portion comprises a threaded outer peripheral surface structured for mating with a threaded inner peripheral surface of the hub spindle.

19. A bearing apparatus for a bicycle hub comprising:

a bearing member comprising:
- an inner peripheral surface having a female threaded portion structured to mate with a male threaded portion of a hub spindle;
- a bearing surface for engaging a bearing; and
- an interlock portion disposed on an end face of the bearing member; and a first lock member comprising:
- an inner peripheral surface for receiving the hub spindle therein;
- a mating portion disposed on an end face of the first lock member for engaging the interlock portion of the bearing member so that the bearing member is nonrotatably fixed relative to the first lock member; and
- a spindle mating portion shaped to nonrotatably fix the first lock member relative to the hub spindle; and a second lock member comprising
- a spindle coupling portion for axially retaining the second lock member to the hub spindle; and
- a collar that engages the first lock member for axially retaining the first lock member to the hub spindle;
- wherein the spindle coupling portion comprises a threaded outer peripheral surface structured for mating with a threaded inner peripheral surface of the hub spindle.

20. A bicycle hub for rotatably mounting a wheel to a bicycle frame, wherein the hub comprises:

a hub spindle having a first end portion and a second end portion, wherein the first end portion comprises:
- a male threaded portion; and
- an interlock portion disposed axially outwardly of the male threaded portion;

a hub body disposed around the hub spindle, wherein the hub body includes a pair of hub flanges;

a first bearing assembly disposed at a first end of the hub body between the hub body and the hub spindle, wherein the first bearing assembly comprises:
- a first cup supported to the hub body;
- a first cone comprising:
  - a female threaded portion for engaging the male threaded portion of the hub spindle; and
  - an interlock portion; and
- a plurality of first rolling bearings disposed between the first cup and the first cone;

a lock member for locking the first cone with respect to the hub spindle, wherein the lock member comprises:
- a first mating portion for nonrotatably mating with the interlock portion of the hub spindle; and
- a second mating portion for nonrotatably mating with the interlock portion of the first cone; and a second bearing assembly disposed at a second end of the hub body between the hub body and the hub spindle, wherein the second bearing assembly comprises:
- a second cup supported to the hub body;
- a second cone supported to the hub spindle; and
- a plurality of second rolling bearings disposed between the second cup and the second cone.

* * * * *